(12) United States Patent
Asadi et al.

(10) Patent No.: US 7,182,190 B2
(45) Date of Patent: Feb. 27, 2007

(54) VIBRATION DAMPER WITH FIRE SAFETY DEVICE

(75) Inventors: Hassan Asadi, Schweinfurt (DE); Peter Wirth, Schonungen (DE); Gerald Fenn, Pfersdorf (DE); Björn Neumann, Bad Bocklet (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/820,372

(22) Filed: Apr. 8, 2004

(65) Prior Publication Data

US 2004/0231935 A1 Nov. 25, 2004

(30) Foreign Application Priority Data

Apr. 9, 2003 (DE) ................. 103 16 188

(51) Int. Cl.
*F16F 9/36* (2006.01)
(52) U.S. Cl. .................. 188/322.18; 267/120
(58) Field of Classification Search .......... 188/322.16, 188/322.17, 322.18, 322.19, 276; 267/120
See application file for complete search history.

(56) References Cited

U.S. PATENT DOCUMENTS 4,230,309 A * 10/1980 Schnitzius ................. 267/120
4,263,488 A * 4/1981 Freitag et al. .............. 267/120
4,548,389 A * 10/1985 Smith et al. ........... 188/322.16
5,115,892 A * 5/1992 Yamaoka et al. ...... 188/322.17
5,454,455 A 10/1995 Kundmüller et al.
5,615,756 A 4/1997 Grundei et al.
5,799,759 A * 9/1998 Koch ..................... 188/322.19
5,810,130 A * 9/1998 Mc Candless ......... 188/322.22
5,862,893 A * 1/1999 Volpel ........................ 188/276
6,153,285 A 11/2000 Christel et al.

FOREIGN PATENT DOCUMENTS

DE 77 03 395 9/1977
DE 38 26 862 C2 9/2002
GB 2156945 A * 10/1985

* cited by examiner

*Primary Examiner*—Thomas Williams
(74) *Attorney, Agent, or Firm*—Cohen Pontani Lieberman & Pavane LLC

(57) ABSTRACT

A piston rod and a piston are installed with freedom of axial movement in a cylinder filled with a working medium, the piston dividing the working space into a space on the piston-rod side of the piston and a space on the side of the piston facing away from the piston rod. A stop disk is mounted on the piston rod in addition to the piston rests against a retainer provided on the cylinder to limit the outward movement of the piston rod during a fire.

7 Claims, 3 Drawing Sheets

VIBRATION DAMPER WITH FIRE SAFETY DEVICE

BACKGROUND OF THE INVENTION

1. Field of the Invention

The invention pertains to a vibration damper including a cylinder filled with a working medium, the cylinder being fitted with a piston rod guide; a piston rod and a piston installed in the cylinder with freedom of axial movement, the piston dividing the cylinder into a working space on the piston rod side and a working space away from the piston rod; and means for limiting the outward movement of the piston rod in the event of a fire.

2. Description of the Related Art

A fire safety device for a vibration damper is known from U.S. Pat. No. 5,454,455. It consists of beads on the cylinder, against which the piston can be supported. This principle works as desired in conventional pistons with a piston ring inside a piston ring groove. In the event of a fire, the piston makes contact with a bead, at least one of which is provided. This contact forces the piston rod guide to assume a slanted position, which prevents both the piston rod and the piston rod guide from being ejected suddenly from the pre-pressurized cylinder.

A piston for a vibration damper is known by way of example from U.S. Pat. No. 5,615,756; the piston ring of this piston is relatively thick, because it is designed to rest against both the top and bottom of the piston. In a piston ring-piston design of this type, the piston ring can lose its shape during a fire, and thus the piston will not be held by the beads; that is, the piston rod guide will not assume a slanted position. The overall result is that the fire safety measure does not go into effect as planned.

A proposed remedy is to impress the beads in the special way described in U.S. Pat. No. 6,153,285. These especially deep beads, however, require that the cylinder be made of a material which can be shaped in the desired way without cracking. In addition, the flow-through cross sections in the piston are always made larger, which has the effect of decreasing the load-bearing capacity of the piston.

SUMMARY OF THE INVENTION

The object of the present invention is to provide a fire safety device which can be used even when the piston ring lies on the piston.

This object is achieved by mounting a stop disk on the piston rod in addition to the piston, which stop disk rests against retaining means in the event of a fire.

When a stop disk of this type is present, the problem described above does not even occur. Especially with respect to its outside diameter, the stop disk can be designed independently of the requirements on the piston, and the material out of which it is made can also be selected independently.

So that the stop disk does not produce any damping forces in the ring-shaped gap formed between it and the cylinder tube during the movement of the piston rod, the stop disk is provided with openings to allow the passage of the working medium.

In a variant of this design, the stop disk is one of the components of a piston valve. Alternatively, the stop disk carries a tension stop. In both cases, there is no need to accept any loss of piston rod stroke, and both solutions are virtually cost-neutral.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
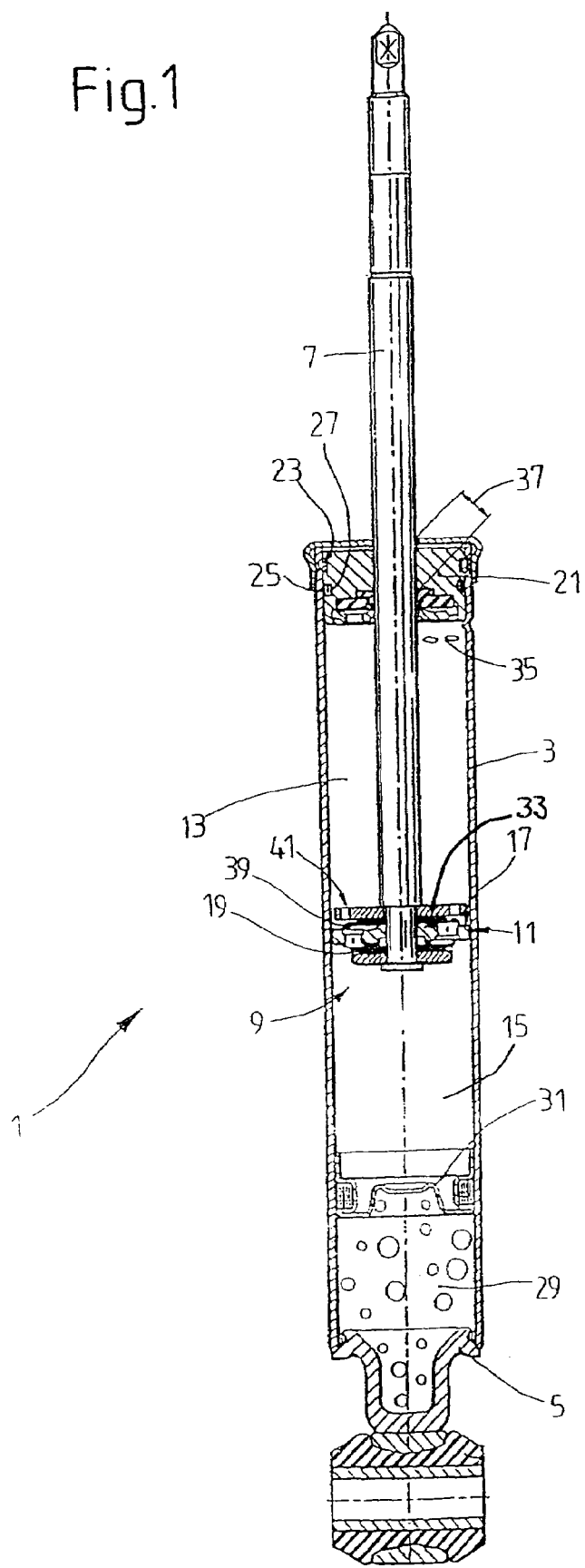
FIG. 1 shows a stop disk as one of the components of a piston valve.

FIG. 1 shows a piston-cylinder assembly 1 in the form of a monotube vibration damper. Inside a cylinder 3, which is closed at one end by a base 5, a piston rod 7 is installed together with a piston 9 with freedom of axial movement. The cylinder is divided by the piston 9 and a piston seal 11 into a working space 13 on the piston-rod side of the piston and a working space 15 on the side of the piston facing away from the piston rod. These two spaces can be connected to each other by damping valves 17, 19, which are indicated schematically in the figure. The piston seal can completely cover the lateral surface of the piston and can be supported axially against the top and bottom thereof.

A piston rod guide 21, which is preferably made of aluminum or of an aluminum alloy, forms the boundary of the working space 13 of the cylinder 3 on the piston rod side. Between the cylinder and the piston rod guide there is a bead 23 to hold the components together axially during the normal operating state of the vibration damper. A ring-shaped seal 25 within a groove 27 ensures that the damping medium-filled cylinder 3 is sealed off effectively.

For compensation of the volume of the inward and outward-traveling piston rod, a compensating space 29 is used, which is filled with a pre-pressurized gas. The compensating space is separated from the working space 15 by an axially movable separating piston 31. This gas pressure, multiplied by the cross-sectional area of the piston 9, exerts an outward-pushing force on the piston rod/piston assembly. As the temperature increases, the pressure of the gas in the compensating space 29 also necessarily rises.

In the event of a fire, temperatures are reached which allow the gas pressure and thus also the outward-pushing force to increase to such an extent that the piston rod comes to rest via a stop disk against retaining means in the form of radially inward-projecting beads 35 in the cylinder 3. The beads are not distributed uniformly around the inside circumference; instead, all of them are on one side. The diameter of the stop disk 33 is larger than that of the piston, and only one side of it comes to rest against the beads, so that a tilting moment is exerted on the piston rod. At these temperatures, the piston rod guide of aluminum or aluminum alloy reaches its thermal stability limit, as a result of which the lock-beading 23 comes loose. The piston rod guide 21 can move slowly out of the cylinder, but it is still held by the slanted piston rod, because a contact surface 37 between the piston rod 7 and the piston rod guide 21 also brings the piston rod into a slanted position. Thus all of the parts in the cylinder which could escape from the cylinder by whatever means are held by the piston rod/piston assembly. The pressurized damping medium can escape from the cylinder, so that the overall pressure level decreases.

The stop disk 33, which, in this exemplary embodiment, also serves as a support disk for the valve disks 39 of the damping valves, is designed to be very strong, so that it will reliably survive the load. So that the stop disk cannot produce any damping forces, it is provided with a plurality of pass-through openings 41.

The stop disk makes it possible to use relatively thick-walled piston rings or even "filigree" type sintered pistons, because these parts play no role whatever in the securing of the piston rod during a fire. Thus even if these components were to be destroyed, the fire safety device would continue to function as intended.

Figure 2:
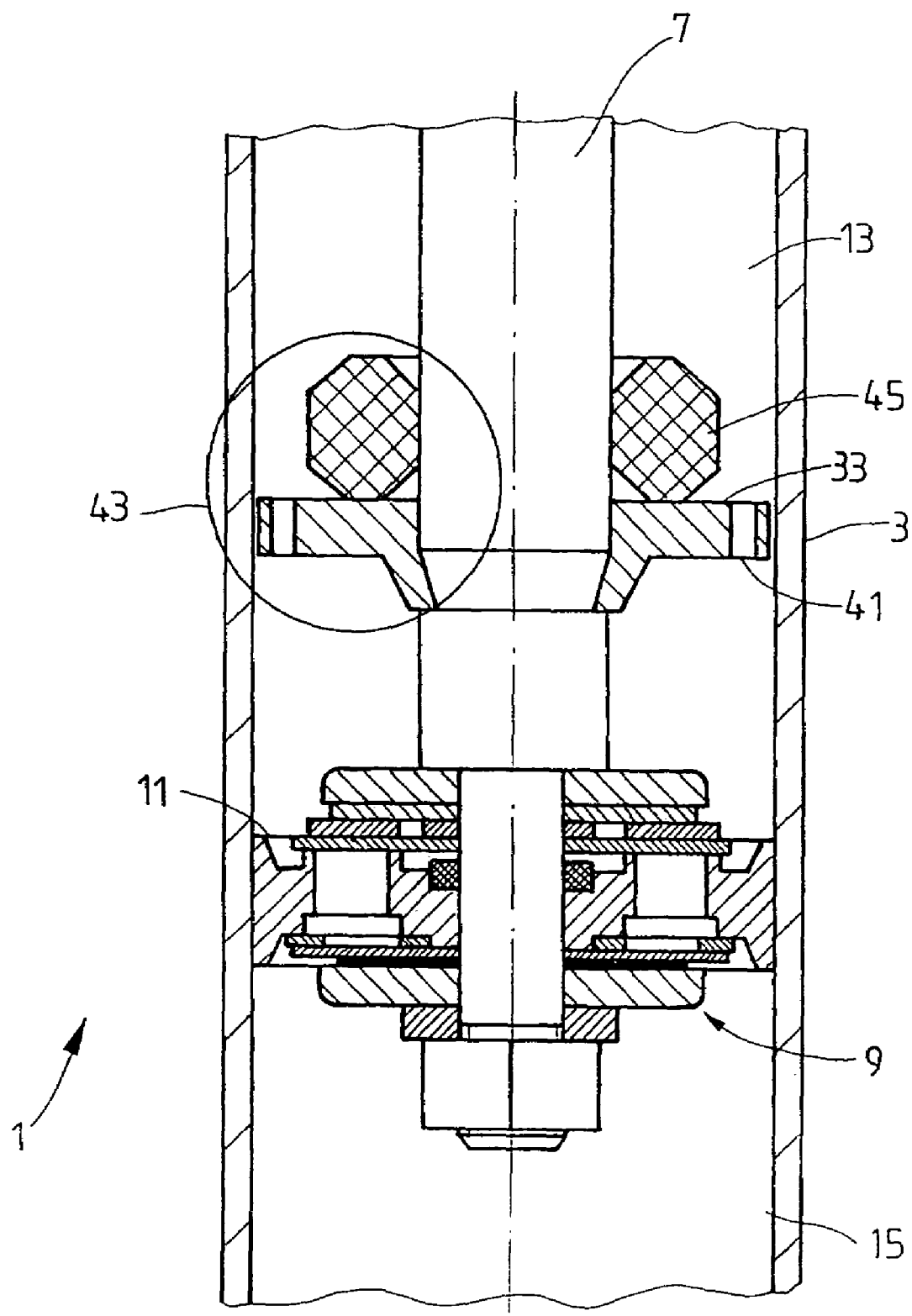
FIG. 2 shows a stop disk as part of a tension stop.

FIG. 2 is intended to show that the stop disk 33 can also be part of an elastic tension stop 43. The stop disk caries a spring element 45, and its diameter is large enough to ensure that, in the event of a fire, it will come in contact with the beads 35. The spring element is formed by an elastomer, which becomes pasty at a temperature level above the maximum operating temperature. This means that the stop disk 33 will come to rest against the beads 35 even if the spring element 45 is already resting against the bottom surface of the piston rod guide 21. There is no need to tolerate a loss of stroke in either of these variants.

Figure 3:
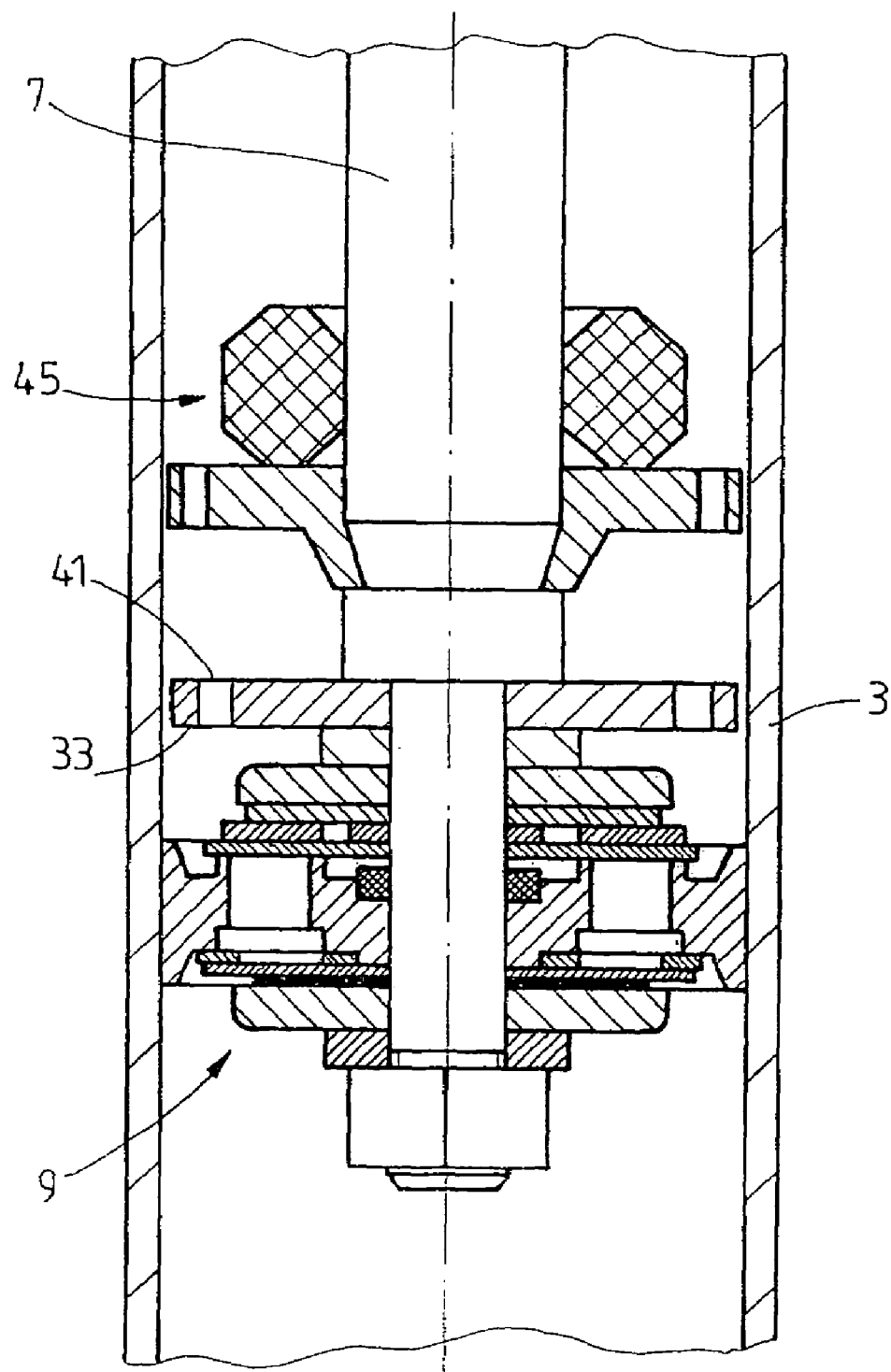
FIG. 3 shows a stop disk as a separate component.

It is also possible to use a separate stop disk 33, which is mounted on the piston rod independently of a tension stop or of the piston. FIG. 3 shows a design of this type. This variant is useful especially when prefabricated, fully assembled pistons 9 are used, which are attached as a single unit to the piston rod 7. Such fully assembled units can thus be used in vibration dampers either with or without fire safety devices.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder assembly comprising:
   a cylinder having a central axis, the cylinder being fitted with a piston rod guide and having an inner wall with at least one radially inward extending projection adjacent to the piston rod guide on one side of the axis;
   a piston rod and a piston installed in the cylinder with freedom of movement along the central axis, the piston having an outer diameter and carrying a piston seal which is in contact with the inner wall of the cylinder, the piston seal having an outer diameter, the piston and the piston seal dividing the cylinder into a working space on the piston rod side and a working space away from the piston rod, said working space being filled with a working medium; and
   a stop disk mounted on the piston rod axially adjacent to the piston, the stop disk having an outer diameter greater than the outer diameter of the piston, but smaller than the outer diameter of the piston seal, whereby, in the event of the piston seal being destroyed in a fire, the stop disk rests against the at least one projection and the piston rod is tilted with respect to the central axis so that the working medium can escape around the piston, and the stop disk having non-throttling pass-through openings to permit flow of the working medium from the working space away from the piston rod into the working space on the piston rod side.

2. The piston-cylinder assembly of claim 1, wherein said stop disk is a component of a piston valve.

3. The piston-cylinder assembly of claim 1, further comprising a tension stop between said stop disk and said piston rod guide.

4. The piston-cylinder assembly of claim 3, wherein said tension stop is made of an elastomeric material.

5. The piston-cylinder assembly of claim 1, wherein said stop disk is spaced from the piston.

6. The piston cylinder assembly of claim 1, further comprising a compensating space which is filled with pressurized gas and is separated from the working space away from the piston rod by an axially movable separating piston.

7. The piston cylinder assembly of claim 1, wherein the stop disk is designed to survive a fire.

\* \* \* \* \*